(12) United States Patent
Perrier et al.

(10) Patent No.: US 7,288,305 B2
(45) Date of Patent: Oct. 30, 2007

(54) PROCESS FOR MANUFACTURING A RECORDABLE OPTICAL DISK, OPTICAL DISK AND REWRITABLE LAYER OBTAINED BY THE PROCESS

(75) Inventors: Robin Perrier, Grenoble (FR); Romain Anciant, Grenoble (FR); Marie-Francoise Armand, Vaulnaveys-le-Haut (FR)

(73) Assignees: MPO International; Commissariat a l'Energie Atomique (FR)

( * ) Notice: Subject to any disclaimer, the term of this patent is extended or adjusted under 35 U.S.C. 154(b) by 0 days.

(21) Appl. No.: 11/129,788

(22) Filed: May 16, 2005

(65) Prior Publication Data

US 2005/0227033 A1    Oct. 13, 2005

Related U.S. Application Data

(63) Continuation of application No. PCT/FR2003/003528, filed on Nov. 28, 2003.

(30) Foreign Application Priority Data

Nov. 28, 2002  (FR) .................................. 02 14981

(51) Int. Cl.
G11B 7/24    (2006.01)

(52) U.S. Cl. .................................. 428/64.4; 430/270.11

(58) Field of Classification Search ..................... None
See application file for complete search history.

(56) References Cited

U.S. PATENT DOCUMENTS

| | | | |
|---|---|---|---|
| 4,640,860 A | 2/1987 | Ritchie | |
| 4,855,992 A * | 8/1989 | Ikegawa et al. | 369/275.5 |
| 6,511,788 B1 * | 1/2003 | Yasuda et al. | 430/270.13 |
| 6,606,293 B1 * | 8/2003 | Okada et al. | 369/94 |
| 2002/0119278 A1 | 8/2002 | Bechevet et al. | |
| 2003/0134229 A1 * | 7/2003 | Yasuda et al. | 430/270.13 |
| 2005/0003302 A1 * | 1/2005 | Yamamoto et al. | 430/270.13 |

FOREIGN PATENT DOCUMENTS

| | | |
|---|---|---|
| EP | 0 605 891 A2 | 7/1994 |
| EP | 1 215 669 A2 | 6/2002 |

OTHER PUBLICATIONS

Atsushi Shibukawa, "In-SiO2 Cermet Films for Optical Recording", Nov. 15, 1981, Applied optics, vol. 20, No. 22, pp. 3884-3888.*

S. Lieberman, "Optical Behavior of RF Sputtering Au-TiO2 Thin Cermet Films, Influence of the Gold Particle Size Concentration", Jun. 6, 2000, Eur. Phys. J. Ap 11, 91-95.*

* cited by examiner

*Primary Examiner*—Bruce H. Hess
(74) *Attorney, Agent, or Firm*—DLA Piper US LLP

(57) ABSTRACT

A process for manufacturing a recordable optical disk including forming a back rewritable layer and depositing a transparent intercalary layer on the back rewritable layer, and forming a front rewritable layer including a metallic alloy and a cermet dielectric such that the front rewritable layer has a transmission rate greater than or equal to about 45%, and a recordable optical disk including a substrate and an active layer including a cermet, wherein the active layer covers at least one back rewritable layer and the active cermet layer has a transmission rate greater than or equal to about 45%.

19 Claims, 5 Drawing Sheets

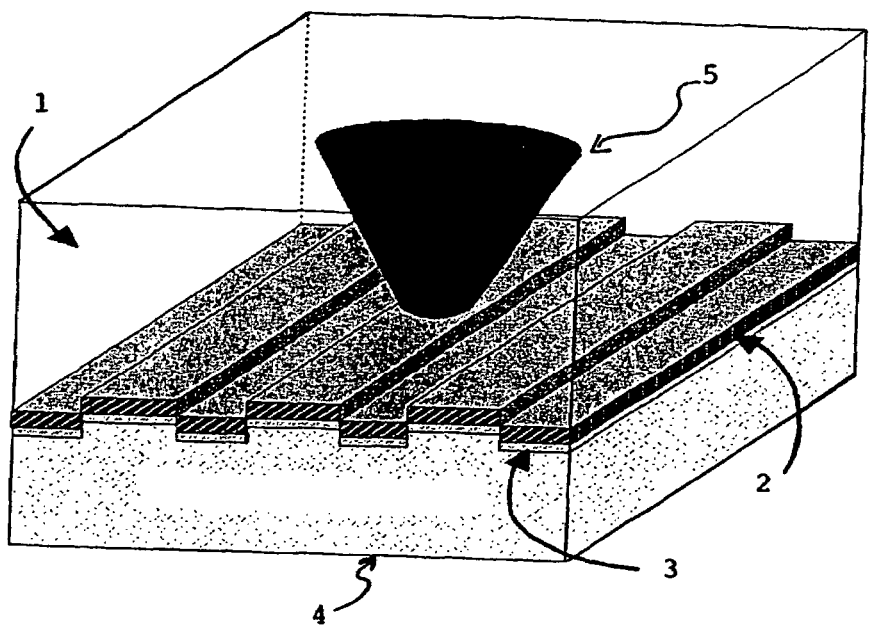
Figure 1
Figure 2
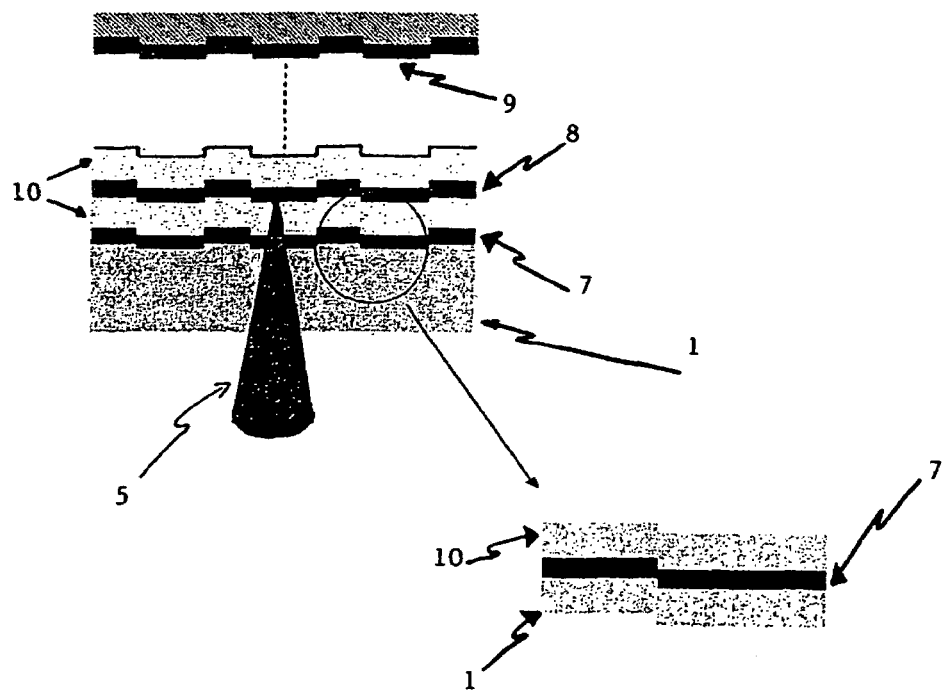

Figure 3

|              | R real (%) | T real (%) | A real (%) |
|--------------|------------|------------|------------|
| Before writing | .3       | 44.9       | 48.7       |
| After writing  | .9       | 44.7       | 49.4       |

Figure 4
Figure 5
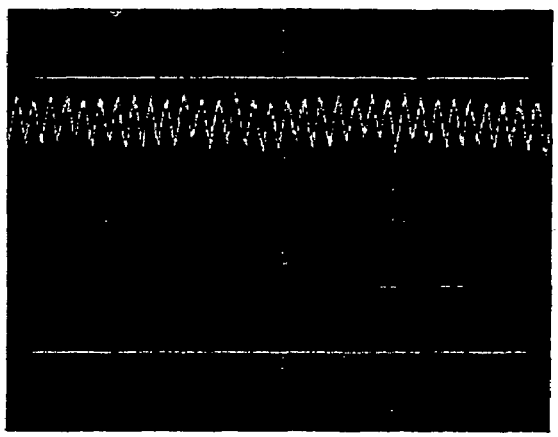
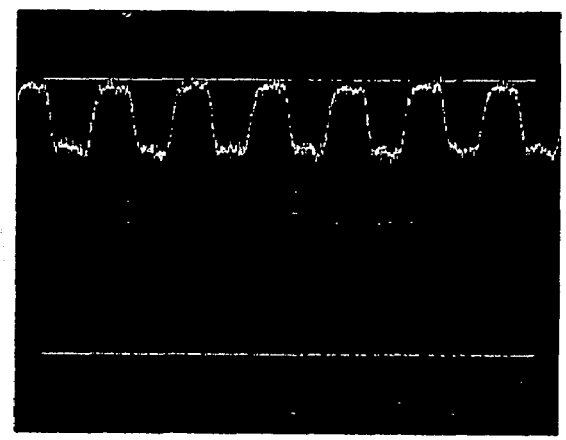
Signal 3T
Signal 14T

| | R effective on mirror zone (%) | T effective on mirror zone (%) |
|---|---|---|
| Before writing | 11 | 49.3 |

Signal 2T

Signal 8T

PROCESS FOR MANUFACTURING A RECORDABLE OPTICAL DISK, OPTICAL DISK AND REWRITABLE LAYER OBTAINED BY THE PROCESS

RELATED APPLICATION

This is a continuation of International Application No. PCT/FR2003/003528, with an international filing date of Nov. 28, 2003 (WO 2004/051638, published Jun. 17, 2004), which is based on French Patent Application No. 02/14981, filed Nov. 28, 2002.

FIELD OF THE INVENTION

This invention relates to multilevel rewritable disks, more particularly, irreversible optical recording including authorizing a single recording, several readings and no deletion or rewriting.

BACKGROUND

At the present time, the great majority of single-level disks that are rewritable once use a technique based on organic colorant. The structure of a disk in accordance with the prior art is shown in FIG. 1.

These disks are generally constituted of an optical stack comprising:
- a transparent substrate 1 consisting of e.g., plastic, polycarbonate;
- a colorant layer 2 sensitive to the writing wavelength;
- a reflecting layer 3 formed, e.g., by an alloy of gold or silver; and
- one or two protection layers 4.

The data is written in a spiral form on the disk surface by focusing a high-power diode laser 5 on the colorant layer through the substrate so that in the end it is represented by an alternation of non-written high-reflection zones and written low-reflection zones. The data is read with a low-power diode laser. This is made possible for reading as well as writing by the presence of a pre-etched groove on the plastic substrate.

Active layers based on organic materials are described, e.g., in U.S. Pat. No. 4,940,618 or EP 353 393. However, weak transmission of the organic colorants prevents stacking several rewritable levels. It is then necessary to turn to an inorganic solution.

The state of the art also includes 1) materials belonging to the family of cermets, a known term for designating metallic ceramic combinations deposited by the projection of a dielectric material and 2) one or several metallic elements.

For example, U.S. Pat. No. 4,640,860 discloses a process for manufacturing such a disk using cermets. However, the type of layer does not permit realization of high-density recording supports because the cermet layers have absorption and reflection rates that are too high to allow for multilayer structures.

Similar solutions are disclosed in JP 56-156942 that describes a disk having a film of the cermet type on a cylindrical support. The writing surface is increased, but such a support is not compatible with the readers generally used.

It would therefore be advantageous to provide recording supports with a high density of information on supports that can be used with standard reading equipment.

SUMMARY OF THE INVENTION

This invention relates to a process for manufacturing a recordable optical disk including forming a back rewritable layer and depositing a transparent intercalary layer on the back rewritable layer, and forming a front rewritable layer including a metallic alloy and a cermet dielectric such that the front rewritable layer has a transmission rate greater than or equal to about 45%.

This invention also relates to a recordable optical disk including a substrate and an active layer including a cermet, wherein the active layer covers at least one back rewritable layer and the active cermet layer has a transmission rate greater than or equal to about 45%.

This invention further relates to a process for recording a rewritable disk including activating a plurality of superposed rewritable layers with at least one activation beam focused in distinct planes by activating a layer positioned in a front plane, which layer has a cermet material with a transmission rate greater than or equal to about 45% with a thickness between about 5 and about 50 nm, and activating a layer positioned in a back plane.

BRIEF DESCRIPTION OF THE DRAWINGS

The invention will be better understood from a reading of the following description that makes reference to the attached figures corresponding to a non-limiting embodiment in which:

FIG. 1 shows a sectional view of a known optical disk;

FIG. 2 shows a sectional view of an optical disk in accordance with aspects of the invention;

FIG. 3 is a table of optical properties measured before and after writing for a layer 20 nm thick consisting of $Au_{81}(Si_3N_4)_{19}$;

FIGS. 4 and 5 show the signals 3T and 14 T for a frequency F=19.6 MHz, linear speed=3.9 m/s, P=10 mW and a layer 20 nm thick consisting of $Au_{81}(Si_3N_4)_{19}$ (DVD format);

DETAILED DESCRIPTION

Figures 6, 7:
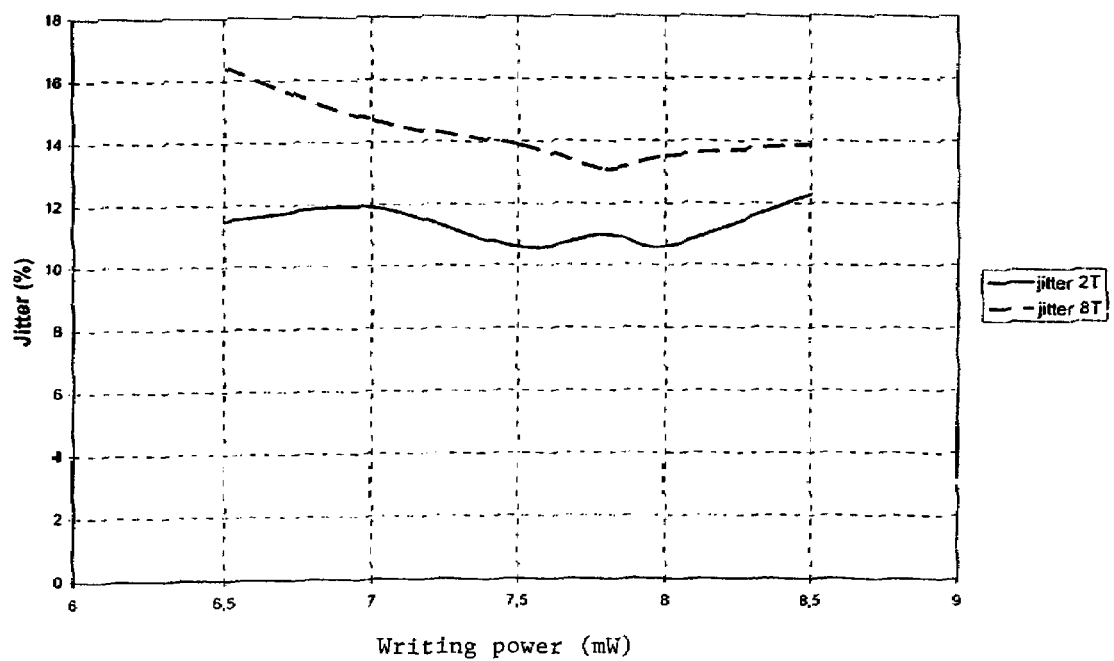
FIG. 6 is a table of optical properties measured before writing for a layer 20 mm thick consisting of $Au_{81}(Si_3N_4)_{19}$.
FIG. 7 is a graph containing the curve for the variation of the width of the digital carrier (jitter) 2T and 8T as a function of the writing power for a writing frequency of 41 MHz and a linear speed of 5.1 m/s. Layer 20 nm thick consisting of $Au_{81}(Si_3N_4)_{19}$ (Blu-ray format)

It will be appreciated that the following description is intended to refer to specific embodiments of the invention selected for illustration in the drawings and is not intended to define or limit the invention, other than in the appended claims.

This invention relates in accordance with its general meaning to a process for manufacturing a recordable optical disk comprising a stage for the formation of a front rewritable layer comprising a metallic alloy and a dielectric constituting a cermet, and at least one prior stage for the formation of a back rewritable layer and for depositing a transparent intercalary layer on the rewritable layer. The front rewritable layer has a transmission rate greater than or equal to about 45%, preferably greater than about 55%. }

The process preferably comprises a plurality of stages for the formation of back rewritable layers, at least certain stages of which include co-depositing a metallic alloy and a dielectric forming a cermet with a transmission rate greater than or equal to about 45% and preferably greater than about 55%, which rewritable layers are separated by transparent intercalary layers advantageously belonging to the family constituted by $Au—Si_3N_4$, $Au—Si_3N_4$, $Au—SiO_2$, $Al—Al_2O_3$, $In—SiO_2$.

The cermet may be of the $Au—Si_3N_4$ type and the atomic proportion of gold may be greater than about 50%.

The rewritable layers advantageously have a thickness comprised between about 5 and about 50 nm.

The rewritable layers may be formed by depositing an active layer of $Au—Si_3N_4$ of approximately 20 nm with an atomic quantity of gold of approximately 80% and an atomic quantity of $Si_3N_4$ of approximately 20% by co-pulverization on a substrate.

The invention also relates to a recordable optical disk comprising a substrate and an active layer of the cermet type, wherein the active layer covers at least one back rewritable layer and the active cermet layer has a transmission rate greater than or equal to about 45% and preferably greater than about 55%.

The active cermet layers preferably cover a back rewritable layer and the consecutive layers are separated by a layer forming a transparent substrate.

The invention also relates to a rewritable layer comprising a deposit of cermet on a substrate, having a transmission rate greater than or equal to about 45% and preferably greater than about 55% and the cermet preferably belongs to the family constituted of $Au—Si_3N_4$, $Au—Si_3N_4$, $Au—SiO_2$, $Al—Al_2O_3$, $In—SiO_2$ and is advantageously an $Au—Si_3N_4$ combination. The atomic proportion of gold is preferably greater than about 50% and the thickness is comprised between about 5 and about 50 nm.

The invention also relates to a process for recording a rewritable disk by activating a plurality of superposed rewritable layers with at least one activation beam focused in distinct planes, comprising at least one activation of a layer positioned in a front plane, which layer has a cermet material with a transmission rate greater than or equal to about 45% and preferably greater than about 55% with a thickness comprised between about 5 and about 50 nm, and comprises at least one activation of a layer positioned in a back plane.

One application is, e.g., recording on multilevel optical disks of the following types: CD (compact disk), DVD (digital versatile disk) or also BD (Blu-ray disk), "R" ("recordable"), WORM (write once read many), DRAW (direct read after write) with n recordable levels.

Turning now to the drawings, FIG. 2 shows a sectional view according to a radial plane of a disk in conformity with aspects of the invention.

The disk is constituted in a known manner by a transparent substrate 1 forming the back of the disk. The disk is, e.g., a disk of polycarbonate (PC), PMMA or the like on which several rewritable layers 7, 8 are formed separated by transparent intercalary layers 10.

A last rewritable layer, back layer 9, is covered by a protective layer that protects against physical degradations.

Rewritable layers 7, 8 are selected in such a manner as to be sufficiently reflective to be seen in a tester or an etcher but also absorbent enough to permit the rewriting of information such that they have a transmission rate that allows the upper or back layers to be reached.

The invention also includes selection of very transparent cermets (T=45% and more) as an active layer for each semi-transparent level. Their reflections and absorptions are in fact quite lower than those known in the art.

Moreover, the atomic fractions of metal in the alloys used in the invention are quite superior to those used in the art. In the invention, the alloys comprise a proportion of metallic alloys greater than about 50%, whereas is in the prior art the proportion of metallic alloys is on the order of 20% for the atomic proportion.

Each of rewritable layers 7, 8 has a thickness of about 5 to about 50 nm. One or several supplementary transparent layers can be added to increase the reflection and/or the contrast of a level.

The proportion of metal increases from the front layer toward the furthest removed layer. The protective layers are optional. The protection layer is not indispensable for the functioning of the disk, but rather allows it to be protected.

The term "front" sometimes hereinafter designates the layer closest to the incident beam used for recording, and the term "back" sometimes hereinafter designates the furthest removed layer.

The manners of obtaining these materials are diverse (mixture from primary nanometric compounds, sol-gel processes, deposits under a vacuum and the like), but their manufacture by cathodic pulverization under a vacuum is preferred.

The deposit is realized on substrates brought to a temperature on the order of about 100° C. to about 150° C. Moreover, the process comprises operations of degassing the target and placing samples in the open air.

The following description refers to a particular exemplary embodiment of the invention for the manufacture of a DVD-R operating at a wavelength of $\lambda=650$ nm.

An active layer of $Au—Si_3N_4$ of approximately 20 nm in thickness is deposited by co-pulverization with an intensity of 0.004 mA/cm on a silicon target and 0.011 mA/cm on the one of gold on a substrate 1 formed of a disk of polycarbonate with a thickness of 0.6 millimeters. The pressure is $10^{-2}$ mbar. The output of argon as well as that of nitrogen is 40 scom. The quantity of gold is then 81% atomic (that of $Si_3N_4$ is therefore 19% atomic).

The optical properties measured before and after writing are given in FIG. 3 showing the optical properties measured before and after writing for a layer of 20 nm thick of $Au_{81}(Si_3N_4)_{19}$.

For a writing frequency of 19.6 MHz, a linear speed of 3.9 m/s and a writing power of 10 mW, the measurements yielded a modulation of 0.26, a resolution of 0.58 and an asymmetry of −6.9%. Signals 3T, 14T are shown in FIGS. 4 and 5 corresponding to a frequency of F=19.6 MHz, linear speed=3.9 m/sm, P=10 mW and a layer 20 nm thick of $Au_{81}(Si_3N_4)_{19}$.

According to a second example, aspects of the invention are applied in the case of the Blu disk with a rewriting and reading wavelength of $\lambda=405$ nm on a polycarbonate substrate 1.2 mm and with a layer of 100 μm.

FIG. 6 shows the table of optical properties measured before writing for a layer 20 nm thick of $Au_{81}(Si_3N_4)_{19}$.

The widths of the carrier (jitter) of signals 2T and 8T were measured digitized as a function of the writing power (FIG. 4) for a writing frequency of 41 MHz and a linear speed of 5.1 m/s, which corresponds to a density of 15 GB for a track pitch of 0.32/Lm.

FIG. 7 shows the curve of the carrier (jitter) digital 2T and 8T as a function of the writing power for a writing frequency of 41 MHz and a linear speed of 5.1 m/s. 20 nm thick layer of $Au_{81}(Si_3N_4)_{19}$. This parameter takes into account the degree of distortion and regularity of the recorded marks. Spectral analysis at a frequency of $v_r$ furnishes a signal proportional to the Fourier transform of the variations of currents induced during the scanning of the spot on the amorphous marks. The variations of reflectivity are not abrupt due to the Gaussian nature of the reading spot on one hand, then the form of the marks and other phenomena of various origins introducing variations over the length of the recorded marks on the other hand. All this is expressed by a widening of the spectral density of the carrier at the reading frequency. This degradation of the spectrum can bring about reading errors. It is quantifiable by measuring the width of the carrier and is currently called jitter (expressed in ns or in %).

Figure 8:
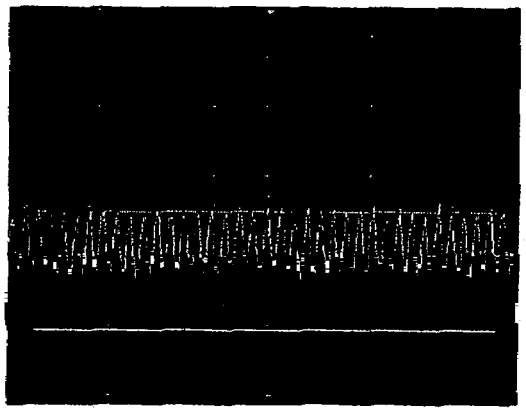
FIGS. 8 and 9 show the signals 2T and 8T corresponding to a frequency F=41 MHz, linear speed=5.1 m/s, P=8 mW for a layer 20 nm thick consisting of $Au_{81}(Si_3N_4)_{19}$.
Figure 9:
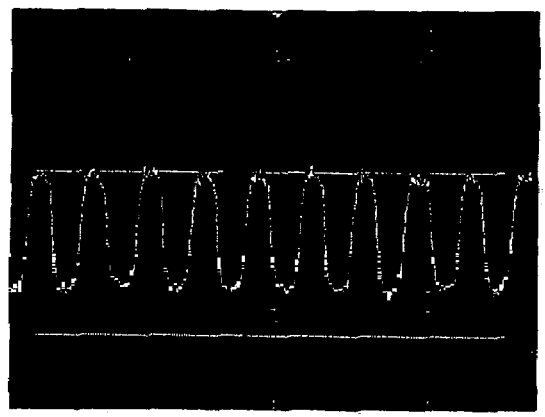

In this configuration and for a writing power of 8 mW there is a modulation of 0.688, a resolution of 0.463 and an asymmetry of −5.6%. Signals 2T and 8T are shown in FIGS. 8 and 9 corresponding to a frequency of F=41 MHz, linear speed=5.1 m/s, P=8 for a layer 20 nm thick of $Au_{81}(Si_3N_4)_{19}$.

Although this invention has been described in connection with specific forms thereof, it will be appreciated that a wide variety of equivalents may be substituted for the specified elements described herein without departing from the spirit and scope of this invention as described in the appended claims.

The invention claimed is:

1. A process for manufacturing a recordable optical disk comprising:
    forming a back rewritable layer and depositing a transparent intercalary layer on the back rewritable layer, and
    forming a front rewritable layer comprising a metallic alloy and a cermet dielectric such that the front rewritable layer has a transmission rate greater than or equal to about 45%.

2. The process according to claim 1, wherein the transmission rate of the front rewritable layer is greater than about 55%.

3. The process according to claim 1, further comprising a plurality of stages of forming back rewritable layers, wherein at least selected ones of the stages comprise co-depositing a metallic alloy and a dielectric forming a cermet with a transmission rate greater than or equal to about 45%, which rewritable layers are separated by transparent intercalary layers.

4. The process according to claim 1, wherein the rewritable layers with a transmission rate greater than or equal to about 45% are formed by depositing a cermet selected from the group consisting of $Au$—$Si_3N_4$, $Au$—$Si_3N_4$, $Au$—$SiO_2$, $Al$—$Al_2O_3$ and $In$—$SiO_2$.

5. The process according to claim 1, wherein the rewritable layers with a transmission rate greater than or equal to about 45% are formed by depositing a $Au$—$Si_3N_4$ cermet and the atomic proportion of gold is greater than about 50%.

6. The process according to claim 1, wherein the rewritable layers with a transmission rate greater than or equal to about 45% have a thickness between about 5 and about 50 nm.

7. The process according to claim 1, wherein the rewritable layers are formed by depositing an active layer of $Au$—$Si_3N_4$ of approximately 20 nm with an atomic quantity of gold of approximately 80% and an atomic quantity of $Si_3N_4$ of approximately 20% by co-pulverization on a substrate.

8. A recordable optical disk comprising:
    a substrate;
    an active layer comprising a cermet;
    at least one back rewritable layer, the active layer having a transmission rate greater than or equal to about 45%; and
    at least one intercalary layer positioned between the active layer and the at least one back rewritable layer.

9. The recordable optical disk according to claim 8, further comprising a plurality of active cermet layers with a transmission rate greater than or equal to about 45%, which active cermet layers cover a back rewritable layer and consecutive cermet layers are separated by a layer forming a transparent substrate.

10. The recordable optical disk according to claim 8, wherein the rewritable layers with a transmission rate greater than or equal to about 45% are formed by depositing a cermet selected from the group consisting of $Au$—$Si_3$, $N_4$, $Au$—$Si_3N_4$, $Au$—$SiO_2$, $Al$—$Al_2O_3$ and $In$—$SiO_2$.

11. The recordable optical disk according to claim 8, wherein the rewritable layers with a transmission rate greater than or equal to about 45% are formed by depositing a $Au$—$Si_3N_4$ cermet and the atomic proportion of gold is greater than about 50%.

12. The recordable optical disk according to claim 8, wherein the rewritable layers with a transmission rate greater than or equal to about 45% have a thickness between about 5 and about 50 nm.

13. The recordable optical disk according to claim 8, wherein the rewritable layers with a transmission rate greater than or equal to about 45% comprise a combination of $Au$—$Si_3N_4$ with a quantity of gold of approximately 80% atomic and a quantity of $Si_3N_4$ of approximately 20% atomic.

14. A rewritable layer comprising a deposit of cermet on a substrate in a multilevel optical disk, the layer having a transmission rate greater than or equal to about 45%.

15. The rewritable layer according to claim 14, wherein the cermet is selected from the group consisting of $Au$—$Si_3$, $N_4$, $Au$—$Si_3N_4$, $Au$—$SiO_2$, $Al$—$Al_2O_3$ and $In$—$SiO_2$.

16. The rewritable layer according to claim 14, wherein the cermet is an $Au$—$Si_3N_4$ combination and the atomic proportion of gold is greater about than 50%.

17. The rewritable layer according to claim 14, wherein the cermet has a thickness between about 5 and about 50 nm.

18. The rewritable layer according to claim 14, wherein the cermet is a combination of $Au$—$Si_3N_4$ with a quantity of gold of approximately 80% atomic and a quantity of $Si_3N_4$ of approximately 20% atomic.

19. A process for recording a rewritable disk comprising activating a plurality of superposed rewritable layers with at least one activation beam focused in distinct planes by activating a layer positioned in a front plane, which layer has a cermet material with a transmission rate greater than or equal to about 45%, with a thickness between about 5 and about 50 nm, and activating a layer positioned in a back plane.

* * * * *